US007917728B2

(12) United States Patent
Radulescu et al.

(10) Patent No.: US 7,917,728 B2
(45) Date of Patent: Mar. 29, 2011

(54) INTEGRATED CIRCUIT AND METHOD FOR TRANSACTION RETRACTION

(75) Inventors: Andrei Radulescu, Eindhoven (NL); Keese Gerard Willem Goossens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1203 days.

(21) Appl. No.: 10/599,201

(22) PCT Filed: Mar. 15, 2005

(86) PCT No.: PCT/IB2005/050907
§ 371 (c)(1),
(2), (4) Date: Sep. 22, 2006

(87) PCT Pub. No.: WO2005/093590
PCT Pub. Date: Oct. 6, 2005

(65) Prior Publication Data
US 2008/0244225 A1    Oct. 2, 2008

(30) Foreign Application Priority Data
Mar. 26, 2004    (EP) .................................... 04101262

(51) Int. Cl.
*G06F 9/00*    (2006.01)
(52) U.S. Cl. ......................................... 712/28; 709/237
(58) Field of Classification Search .................. 712/28; 709/237
See application file for complete search history.

(56) References Cited

FOREIGN PATENT DOCUMENTS
JP    8171528 A    7/1996
JP    1129647 A    10/1999

*Primary Examiner* — Alford W Kindred
*Assistant Examiner* — Benjamin P Geib

(57) ABSTRACT

An integrated circuit having a plurality of processing modules (I, T) is provided. At least one first processing module (I) issues at least one transaction towards at least one second processing module (T). Said integrated circuit further comprises at least one first transaction retraction unit (TRU1) for indicating an allowance to said at least one first of said processing modules (I) to retract said at least one transaction according to the sate of said second processing module (T).

8 Claims, 4 Drawing Sheets

INTEGRATED CIRCUIT AND METHOD FOR TRANSACTION RETRACTION

FIELD OF THE INVENTION

The invention relates to an integrated circuit having a plurality of processing modules and an interconnect means for coupling said plurality of processing, a method for transaction retraction in such an integrated circuit, and a data processing system.

BACKGROUND OF THE INVENTION

Systems on silicon show a continuous increase in complexity due to the ever increasing need for implementing new features and improvements of existing functions. This is enabled by the increasing density with which components can be integrated on an integrated circuit. At the same time the clock speed at which circuits are operated tends to increase too. The higher clock speed in combination with the increased density of components has reduced the area which can operate synchronously within the same clock domain. This has created the need for a modular approach. According to such an approach the processing system comprises a plurality of relatively independent, complex modules. In conventional processing systems the systems modules usually communicate to each other via a bus. As the number of modules increases however, this way of communication is no longer practical for the following reasons. On the one hand the large number of modules forms a too high bus load. On the other hand the bus forms a communication bottleneck as it enables only one device to send data to the bus.

A communication network forms an effective way to overcome these disadvantages. Networks on chip (NoC) have received considerable attention recently as a solution to the interconnect problem in highly-complex chips. The reason is twofold. First, NoCs help resolve the electrical problems in new deep-submicron technologies, as they structure and manage global wires. At the same time they share wires, lowering their number and increasing their utilization. NoCs can also be energy efficient and reliable and are scalable compared to buses. Second, NoCs also decouple computation from communication, which is essential in managing the design of billion-transistor chips. NoCs achieve this decoupling because they are traditionally designed using protocol stacks, which provide well-defined interfaces separating communication service usage from service implementation.

Using networks for on-chip communication when designing systems on chip (SoC), however, raises a number of new issues that must be taken into account. This is because, in contrast to existing on-chip interconnects (e.g., buses, switches, or point-to-point wires), where the communicating modules are directly connected, in a NoC the modules communicate remotely via network nodes. As a result, interconnect arbitration changes from centralized to distributed, and issues like out-of order transactions, higher latencies, and end-to-end flow control must be handled either by the intellectual property block (IP) or by the network.

Most of these topics have been already the subject of research in the field of local and wide area networks (computer networks) and as an interconnect for parallel machine interconnect networks. Both are very much related to on-chip networks, and many of the results in those fields are also applicable on chip. However, NoC's premises are different from off-chip networks, and, therefore, most of the network design choices must be reevaluated. On-chip networks have different properties (e.g., tighter link synchronization) and constraints (e.g., higher memory cost) leading to different design choices, which ultimately affect the network services.

NoCs differ from off-chip networks mainly in their constraints and synchronization. Typically, resource constraints are tighter on chip than off chip. Storage (i.e., memory) and computation resources are relatively more expensive, whereas the number of point-to-point links is larger on chip than off chip. Storage is expensive, because general purpose on-chip memory, such as RAMs, occupy a large area. Having the memory distributed in the network components in relatively small sizes is even worse, as the overhead area in the memory then becomes dominant.

For on-chip networks computation too comes at a relatively high cost compared to off-chip networks. An off-chip network interface usually contains a dedicated processor to implement the protocol stack up to network layer or even higher, to relieve the host processor from the communication processing. Including a dedicated processor in a network interface is not feasible on chip, as the size of the network interface will become comparable to or larger than the IP to be connected to the network. Moreover, running the protocol stack on the IP itself may also be not feasible, because often these IPs have one dedicated function only, and do not have the capabilities to run a network protocol stack.

Introducing networks as on-chip interconnects radically changes the communication when compared to direct interconnects, such as buses or switches. This is because of the multi-hop nature of a network, where communication modules are not directly connected, but separated by one or more network nodes. This is in contrast with the prevalent existing interconnects (i.e., buses) where modules are directly connected. The implications of this change reside in the arbitration (which must change from centralized to distributed), and in the communication properties (e.g., ordering, or flow control).

Modern on-chip communication protocols (e.g., Device Transaction Level DTL, Open Core Protocol OCP, and AXI-Protocol) operate on a split and pipelined basis with transactions consisting of a request and a response, and the bus is released for use by others after a request issued by a master is accepted by a corresponding slave. Split pipelined communication protocols are used especially in multi-hop interconnects (e.g., networks on chip, or buses with bridges), allowing an efficient utilization of the interconnect The efficiently of a split bus can be increased for cases where a response generation at the slave takes is time consuming. On a pipelined protocol, a master is allowed to have multiple outstanding requests (i.e., requests for which the response is pending or expected).

The above mentioned protocols are designed to operate at a device level, as opposed to a system or interconnect level. In other words they are designed to be independent of the actual interconnect implementation (e.g., arbitration signals are not visible) allowing the reuse of intellectual property blocks IP and their earlier integration. In addition, these communication protocols are designed to ensure that an IP block can communicate "naturally" (e.g., word width and burst sizes are configurable to suit the device rather than a bus).

Some of these protocols like DTL include a function to retract transactions as an additional protocol feature. An issued transaction can only be retracted without causing any change in the state of a slave when the transaction has not been accepted yet by a slave.

Transaction retraction is usually implemented by invalidating the command signals. However, in order to avoid that the slave is left in an incorrect state due to the transaction retraction, the slave is enforced by the protocol to process the transaction in merely one cycle. This can be especially difficult in a system with a high clock rate. Furthermore, the retraction of a command may not be possible, when address signals (i.e., command, address, and other command parameters, such as burst length) are independent of the write data signals. For example, when write data for a command has already been (partially) accepted by a slave and sent further before the actual write command itself is accepted (as implemented in the AXI protocol), the write command cannot be retracted, since there may be no way to seize and remove the already sent write data. Accordingly, the AXI protocol does not even allow transaction retraction.

It is therefore an object in the invention to provide an improved transaction retraction in a transaction based communication environment.

This object is achieved by an integrated circuit according to claim 1, a method for transaction retraction according to claim 7, and a data processing system according to claim 8.

Therefore, an integrated circuit having a plurality of processing modules I, T is provided. At least one first processing module I issues at least one transaction towards at least one second processing module T. Said integrated circuit further comprises at least one first transaction retraction unit TRU1 for indicating an allowance to said at least one first of said processing modules I to retract said at least one transaction according to the state of said second processing module T.

The proposed integrated circuit allows transaction retraction in a controlled way, whereby the possibility of inconsistent states in the target is avoided, and unnecessary constraints on targets are eliminated. The ability to actually perform an effective transaction retraction is a desirable property, since the load on the interconnect can be reduced when a transaction is not needed anymore (e.g., data to be sent is too late to be processed, or read data is not useful anymore because some deadline has passed). Additionally, the time period is reduced during which a process is blocked as it is waiting on the interconnect acceptance of/response to a transaction which is no longer needed anymore.

According to an aspect of the invention said integrated circuit comprise at least one first transaction retraction unit, which is associated to said at least one second processing module. Hence, the decision to allow the retraction is performed on the target side and not on the side of an initiator. As the transaction retraction may be implemented by the transaction retraction units, the arrangement of the processing modules do not need to be changed. Therefore, the proposed scheme is simple and easy to implement, and provides backward compatibility with existing protocols.

According to a further aspect of the invention at least one second transaction retraction unit, which is associated to said first processing module, is provided to issue an explicit transaction retraction request to said first transaction retraction unit or said second processing unit. Said first transaction retraction unit indicates an allowance of said transaction retraction request. Here, the retraction is explicitly requested and explicitly allowed.

According to still a further aspect of the invention said first transaction retraction unit TRU1 indicates the allowance of said transaction retraction request rt, if the transaction retraction request rt is present.

According to a further aspect of the invention, at least one second transaction retraction unit TRU2 is associated to said first processing module for issuing an explicit transaction retraction request rt to said first transaction retraction unit TRU1 or said second processing module T. Said first transaction retraction unit TRU1 indicates an allowance of said transaction retraction request rt, if a valid command CMD issued from said first processing module I is present, the valid command CMD has not been accepted by the second processing module T, and the transaction retraction request rt is present.

According to a further aspect of the invention said first retraction unit indicates an allowance of a requested transaction retraction if a valid command issued from said first processing module is present, and the valid command has not been accepted yet by the second processing module. Here, the allowance of the retraction is performed implicitly.

The invention is also related to a method for transaction retraction in an integrated circuit having a plurality of processing modules I, T. At least one transaction is issued by at least one first processing module I towards at least one second processing module T. The allowance to retract said at least one transaction according to the state of said second processing module (T) is indicated to said at least one first of said processing modules I.

The invention further relates to a data processing system having a plurality of processing modules I, T. At least one first processing module I issues at least one transaction towards at least one second processing module T. Said integrated circuit further comprises at least one first transaction retraction unit TRU1 for indicating an allowance to said at least one first of said processing modules I to retract said at least one transaction according to the state of said second processing module T.

Accordingly, the transaction retraction may also be performed in a multi-chip network or a system with several separate integrated circuits.

The invention is based on the idea to extend the handshake process for a transaction retraction by a special signal or a special combination of signals to grant or refuse a transaction retraction. A transaction retraction is granted when the state in the slave permits this, otherwise it is refused (e.g., a write retraction can be granted when no write data from that transaction has been sent further).

Further aspects of the invention are described in the dependent claims.

These and other aspects of the invention are apparent from and will be elucidated with reference to the embodiment(s) described hereinafter.

DESCRIPTION OF THE PREFERRED EMBODIMENTS

The following embodiments relate to systems on chip, i.e. a plurality of modules on the same chip (including e.g. system in a package, multi-die modules) or on different chips, communicate with each other via some kind of interconnect. The interconnect is embodied as a network on chip NOC. The network on chip may include wires, bus, time-division multiplexing, switches, and/or routers within a network. At the transport layer of said network, the communication between the modules may be performed over connections. A connection is considered as a set of channels, each having a set of connection properties, between a first module and at least one second module. For a connection between a first module and a single second module, the connection may comprises two channels, namely one from the first module to the second channel, i.e. the request channel, and a second from the second to the first module, i.e. the response channel. The request channel is reserved for data and messages from the first to the second, while the response channel is reserved for data and messages from the second to the first module. However, if the connection involves one first and N second modules, 2*N channels are provided. The connection properties may include ordering (data transport in order), flow control (a remote buffer is reserved for a connection, and a data producer will be allowed to send data only when it is guaranteed that space is available for the produced data), throughput (a lower bound on throughput is guaranteed), latency (upper bound for latency is guaranteed), the lossiness (dropping of data), transmission termination, transaction completion, data correctness, priority, or data delivery.

Figure 1:
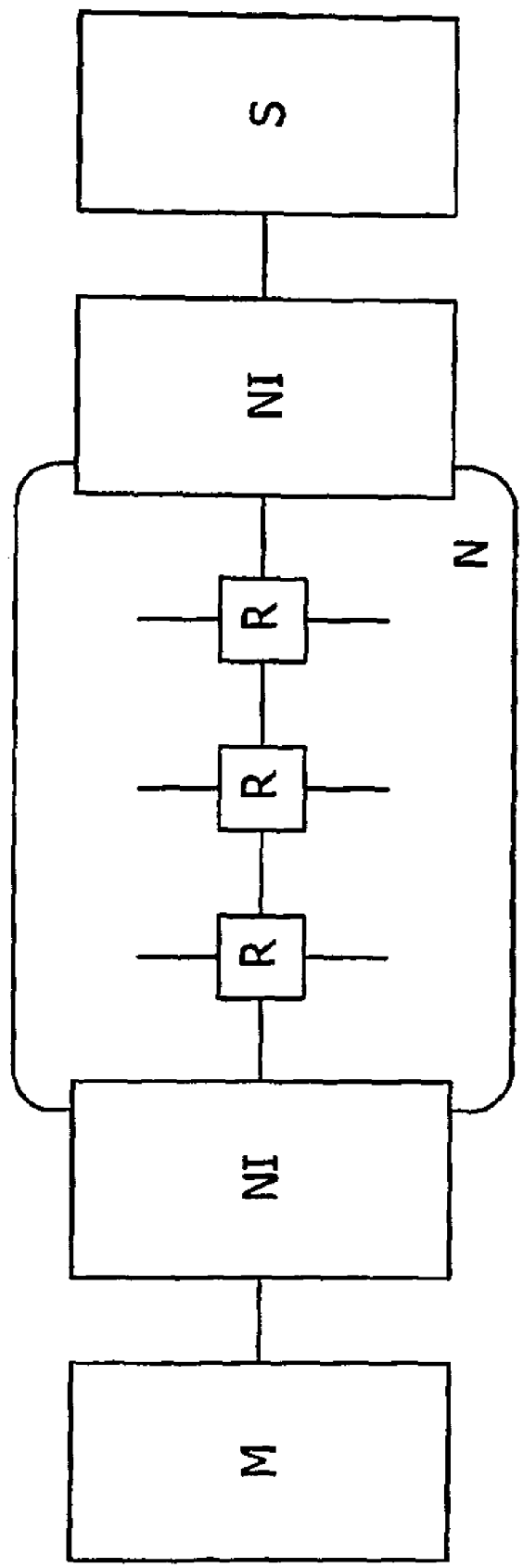
FIG. 1 shows a schematic representation of a network on chip according to the invention.

FIG. 1 shows a basic arrangement of a network on chip according to the invention. In particular, a master module M and a slave module S each with an associated network interface NI are depicted. Each module M, S is connected to a network N via its associated network interface NI, respectively. The network interfaces NI are used as interfaces between the master and slave modules M, S and the network N. The network interfaces NI are provided to manage the communication between the respective modules M, S and the network N, so that the modules can perform their dedicated operation without having to deal with the communication with the network or other modules. The network N comprises a plurality of network routers R for routing data through the network from one network interface NI to another.

The modules as described in the following can be so-called intellectual property blocks IPs (computation elements, memories or a subsystem which may internally contain interconnect modules) that interact with network at said network interfaces NI. A network interface NI can be connected to one or more IP blocks. Similarly, an IP block can be connected to more than one network interfaces.

Figure 2:
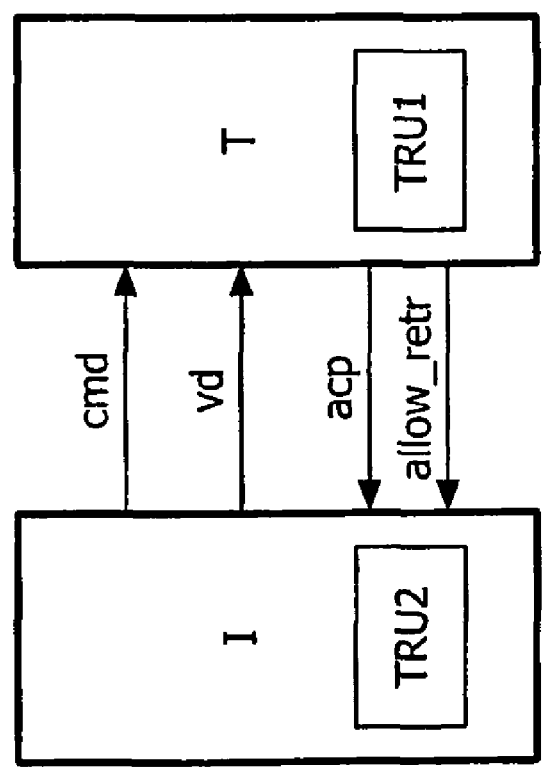
FIG. 2 shows a schematic representation of the signals exchanged between an initiator and a target according to a first embodiment.

FIG. 2 show a schematic representation of the functional interrelation of a communication between two modules, namely an initiator module I and a target module T, according to a first embodiment. The initiator I as well as the target T may comprise a transaction retraction unit TRU2, TRU1 for controlling the retraction of a transaction. The communication between the initiator module I and the target module T is based on request-response transactions, where the initiator module I initiates a transaction by placing a request, possibly with some data or required connection properties. The request is delivered to the target module T.

The relation between the master—slave of FIG. 1 and the initiator—target of FIG. 2 is such that the initiator and target as shown in FIG. 2 are link-level entities, while master and slave as shown in FIG. 1 are end-to-end entities. Accordingly, the master starts a transaction, and the slave executes it. However, the initiator I produces a request (which can represent forwarding it, like for the network interface NI of the slave), and the target T receives a request without necessarily executing it (like the network interface NI of the master). A master is always an initiator, and the slave is always a target executing the transactions, but initiators and targets are not necessarily masters and slaves, respectively.

In FIG. 2 only those signals or ports are shown which are required for explaining the basic principle of the invention. Other signals may be present in the protocol. The initiator I comprises a command output port cmd, and a valid output port vd, i.e. the target receives a command signal cmd and a valid signal vd. The target T comprises two output ports, namely an accept port acp and a retraction allow port allow_retr. A transaction request is signaled by the initiator I by rising the valid port vd, i.e. the valid signal is set to high, signaling that valid command exists on the command port cmd. (For the principles of the invention it is not important which command was actually issued by the initiator I). A request is accepted by the target T when both the valid signal vd and the accept signal acp are high. As an alternative, the accept signal acp may be set to high by default in order to signal unconditional willingness of the target to accept requests.

As mentioned above the transaction retraction units TRU2, TRU1 of the initiator I and the target T may serve to control the transaction retraction. A retraction of a transaction is then performed by simply lowering the valid signal vd and setting it to low. However, according to the first embodiment this is only allowed when the allow retraction signal allow_retr is set high by the target T signaling if the state in the target T permits a transaction retraction. If the signal allow_retr is low, it is forbidden to perform a transaction retraction. In other words, the transaction retraction unit TRU2 of the initiator I performs a retraction by lowering the valid signal vd, if the transaction retraction unit TRU1 of the target T outputs the allowance signal allow_retr on a high state. The retraction may be performed until the target T accepts the command issued by the initiator by setting the accept signal acp to high.

Figure 3:
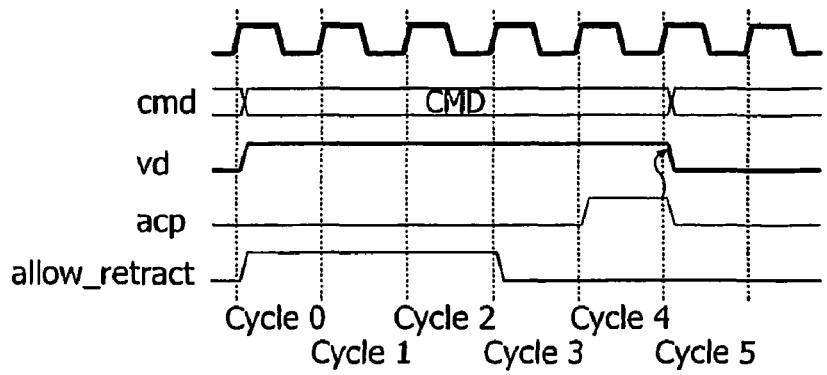
FIGS. 3-5 show schematic representations of example timing diagrams of the signals of the first embodiment of FIG. 2.
Figure 4:
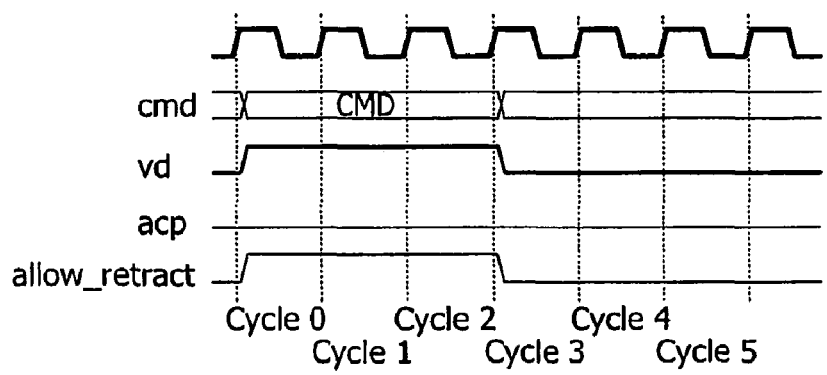
Figure 5:
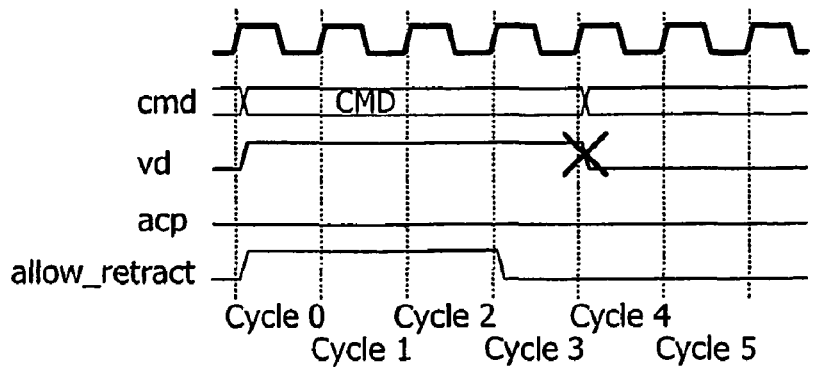

In FIGS. 3 to 5 timing diagrams for the signals of FIG. 2 are shown. In particular, the timing of the clock clk, the command signal cmd, the valid signal vd, the accept signal acp and the retraction allowance signal allow_retr are shown, respectively. The first embodiment is related to an implicit transaction retraction, i.e. without a specific retraction port or signal. A signal, i.e. the signal allow_retr, from the target T to the initiator I specifies when a transaction can be retracted.

FIG. 3 shows the timing diagram of the usual operation, i.e. the command CMD from the initiator I is accepted by the slave S, since the valid signal vd as well as the accept signal acp are both high at the beginning of cycle 5 (see arrow in FIG. 3). As mentioned above, a command CMD can only be retracted when the signal allow_retract is high. In the FIG. 3, the target T needs two cycles (Cycles 3 and 4) to accept a command CMD. Therefore, it lowers the signal allow retract in Cycle 3 and 4, as long as it processes/accepts the transaction. In the last cycle of the transaction processing (Cycle 4) it also rises the accept signal acp to indicate the acceptance of the transaction by the target T.

FIG. 4 shows the timing diagram for the case where the transaction retraction is performed. Until the beginning of cycle 3, the valid signal vd and the retraction allowance signal allow_retr are both high and the acceptance signal acp is low, i.e. a retraction of the transaction is possible.

FIG. 5 shows the timing diagram for a case, where the transaction retraction is not allowed. During cycle 3, the valid signal vd is high but the retraction allowance signal allow_retr is low, i.e. a retraction of the transaction is not possible in cycle 3 as marked with a cross in FIG. 5. However, a retraction can be possible in cycles 0-2 as the valid signal vd and the retraction allowance signal allow_retr are high while the acceptance signal acp is low.

Figure 6:
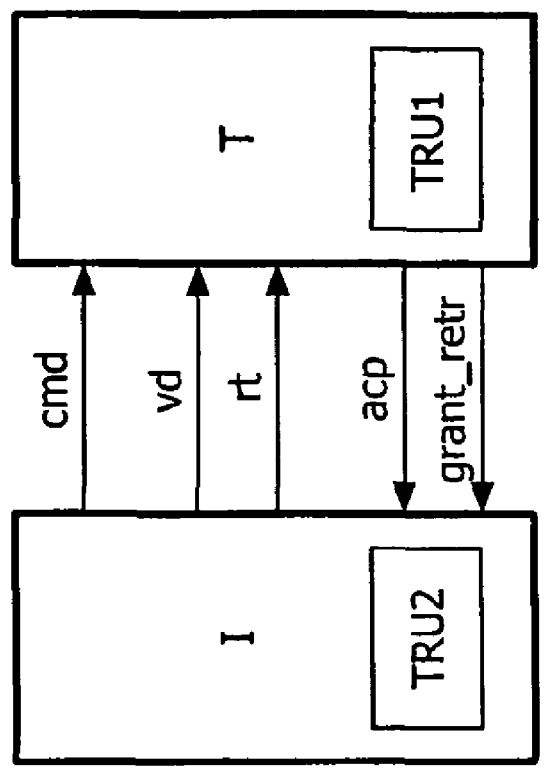
FIG. 6 shows a schematic representation of the signals exchanged between an initiator and a target according to a second embodiment.

In other words, a retraction is allowed according to the first embodiment as long as the valid signal vd and the retraction allowance signal allow_retr are high while the acceptance signal acp is low FIG. 6 shows a schematic representation of a functional interrelation of a communication between two modules, namely an initiator module I and a target module T, according to a second embodiment. The initiator I as well as the target T may comprise a transaction retraction unit TRU2, TRU1 for controlling the retraction of a transaction. The basic operation of the two modules corresponds to their operation in the first embodiment according to FIG. 2. In FIG. 6 only those signals or ports are shown which are required for explaining the basic principle of the invention. The initiator I comprises a command output port cmd, a valid output port vd, and a retract output port rt, i.e. the target receives a command signal cmd, a valid signal vd, and a retract signal rt. The target T comprises two output ports, namely an accept port acp and a grant retraction out port grant_retr.

A transaction request is signaled by the initiator, i.e. the transaction retraction unit TRU2, by rising the valid signal vd, i.e. the valid signal is set to high, in order to signal that a valid command exists on the command port cmd. (For the principles of the invention it is not important which command was actually issued by the initiator I). A request is accepted by the target T when both the valid port vd and the accept port acp are high. As an alternative, the accept port acp may be set to high by default in order to signal an unconditional willingness of the target to accept requests.

According to a second embodiment, a transaction retraction is requested by the initiator, i.e. the transaction retraction unit TRU2, by rising the retract signal rt. A request for a transaction retraction from the initiator I makes only then sense when the valid signal vd is also high, i.e., when there is a valid command being issued to the target which may be retracted. In addition, a transaction is only retracted when the retract signal rt and the grant retraction signal grant_retr are high (provided the valid signal vd is also high and the accept signal acp is low), otherwise the retraction request will produce no effect.

Figure 7:
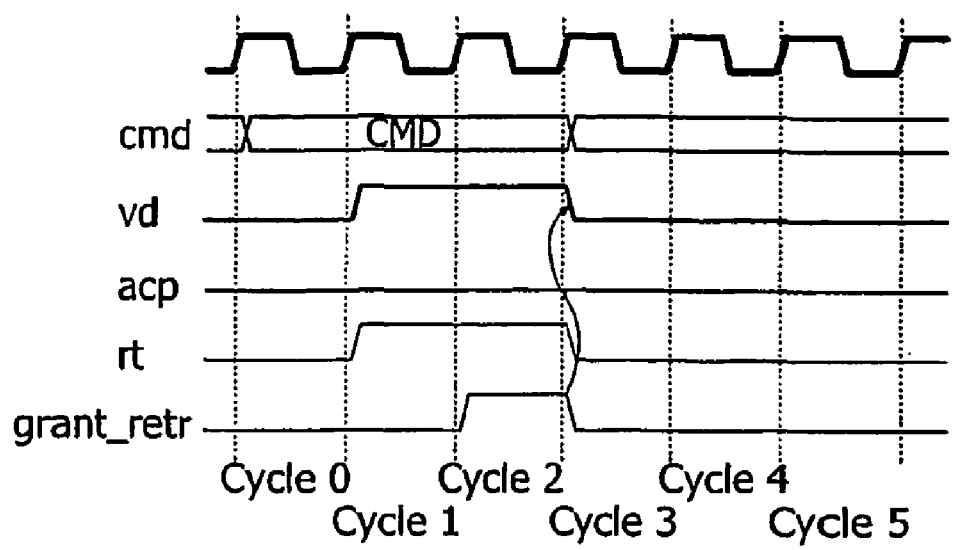
FIG. 7 shows a schematic representations of timing diagrams of the signals of the second embodiment of FIG. 6.

In FIG. 7 a timing diagram for the signals of in FIG. 6 are shown. In particular, the timing of the clock clk, the command signal cmd, the valid signal vd, the accept signal acp, the retract signal rt, and the grant_retr are shown, respectively. The second embodiment is related to an explicit transaction retraction, i.e. with a special retraction port or signal. The initiator I, i.e. the transaction retraction unit TRU2, signals that it wants to retract a command with an explicit signal, namely the retract signal rt. As the accept signal acp is low and the valid signal vd and the retract signal rt are both high during cycles 1-2, the transaction retraction unit TRU1 grants the retraction or not according to the signal grant_retr. Hence, the initiator I can retract the command only in the cycle 2.

Figure 8:
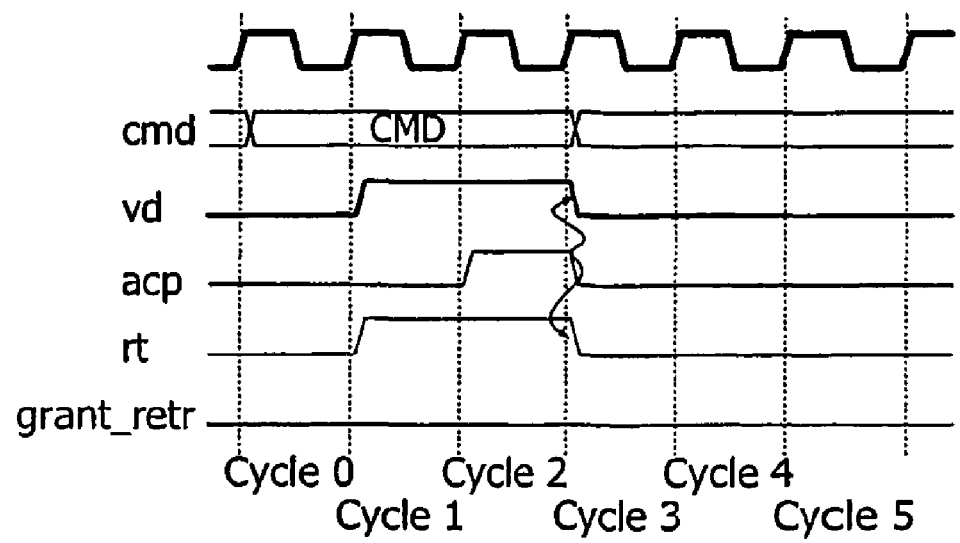
FIG. 8 shows a schematic representations of timing diagrams of the signals of the second embodiment of FIG. 6.

In FIG. 8 a timing diagram for the signals of in FIG. 6 are shown. In particular, the timing of the clock clk, the command signal cmd, the valid signal vd, the accept signal acp, the retract signal rt, and the grant_retr are shown, respectively. Here, an example of an explicit transaction retraction request is shown which is not been granted. The initiator I signals that it wants to retract a command with an explicit signal, namely the retract signal rt as shown in FIG. 7. The retraction is granted or not with a signal grant_retr from the target T. However, as the accept signal acp is high, a retraction can not be granted.

In other words, a retraction is allowed according to the second embodiment provided the valid signal vd and the retract signal rt are high, while the acceptance signal acp is low.

The above mentioned granting of a retraction request may be based on a retraction signal or on a group of control signals on which one combination represents the retraction.

The above described transaction retraction is meant as an extension to an existing protocol. The extensions proposed in the two embodiments ensure full compatibility with the original protocols. If one of the initiator and target does not implement the extension, the added signals can be set to "low" such that they do not have any effect.

The proposed scheme is in particular relevant for device level communication protocols (e.g., DTL, AXI, OCP). It allows transaction retraction in a controlled way: avoiding the possibility of inconsistent states in the target, and eliminating unnecessary constraints on targets. The proposed scheme is simple and easy to implement, and provides backward compatibility with existing protocols.

Although the principles of the invention were described with regards to network on chip, this is not only applicable to such network, but also to bus protocols, such as DTL. All the signals shown in the figures are part of the DTL spec (except those related to retraction: allow_retr, retract, grant_retr).

In a network, command retraction could be implemented at the link between the master and its network interface. This is because the master that issued a command can decide that the command is not needed anymore.

Another place where the command retraction can be implemented is at the link between a slaves network interface and a slave. The reason could be that a transaction with a higher priority has arrived in the network interface, and, if the issued transaction (with a lower priority) has not been accepted, it can be retracted to allow the higher priority transaction to proceed.

The invention relates to an extended handshake comprising a special response to grant or refuse a transaction retraction. A target can indicate on its own motion with a signal (allow_retr) whether the initiator can retract a transaction. Alternatively, the target indicates this upon a request signal by the initiator (grant_retr and retract).

In the above embodiments a retraction request may be issued to the target T and/or the transaction retraction unit TRU1. If the transaction retraction unit TRU1 is part of the target T as shown in FIG. 2 and FIG. 6, the retraction request will be issued to the target/transaction retraction unit, while if the transaction retraction unit TRU1 is not implemented in the target T but for example close to is, the retraction request may be issued to the transaction retraction unit TRU1.

Therefore, an integrated circuit having a plurality of processing modules (I, T) is provided. At least one first processing module (I) issues at least one transaction towards at least one second processing module (T) on a link-level basis. Said integrated circuit further comprises at least one first transaction retraction unit (TRU1) for indicating an allowance to said at least one first of said processing modules (I) to retract said at least one transaction according to the state of said second processing module (T).

The second transaction retraction unit TRU2 is associated to said first processing module for issuing an explicit transaction retraction request rt to said first transaction retraction unit TRU1 or said second processing module T. Said first transaction retraction unit TRU1 indicates the allowance of said transaction retraction request rt. In addition, said first transaction retraction unit TRU1 indicates the allowance of said transaction retraction request rt and the transaction retraction request rt is present. Accordingly, a 'default allowed retraction' is possible, i.e. the grant retract would be high even if there is no valid cmd and/or a retraction request. However, if one or both are present the retraction signal could change to low.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. Integrated circuit having a plurality of processing modules (I, T), wherein at least one first processing module (I) issues at least one transaction towards at least one second processing module (T), comprising:
   at least one first transaction retraction unit (TRU1) for indicating the allowance to said at least one first of said processing modules (I) to retract said at least one transaction according to the state of said second processing module (T).

2. Integrated circuit according to claim 1, wherein
   said at least one first transaction retraction unit (TRU1) is associated to said at least one second processing module (T).

3. Integrated circuit according to claim 1, further comprising
   at least one second transaction retraction unit (TRU2) being associated to said first processing module for issuing an explicit transaction retraction request (rt) to said first transaction retraction unit (TRU1) or said second processing module (T),
   wherein said first transaction retraction unit (TRU1) indicates the allowance of said transaction retraction request (rt).

4. Integrated circuit according to claim 3, wherein said first transaction retraction unit (TRU1) indicates the allowance of said transaction retraction request (rt), if the transaction retraction request (rt) is present.

5. Integrated circuit according to claim 1, further comprising
   at least one second transaction retraction unit (TRU2) being associated to said first processing module for issuing an explicit transaction retraction request (rt) to said first transaction retraction unit (TRU1) or said second processing module (T),
   wherein said first transaction retraction unit (TRU1) indicates an allowance of said transaction retraction request (rt), if a valid command (CMD) issued from said first processing module (I) is present, the valid command (CMD) has not been accepted by the second processing module (T), and the transaction retraction request (rt) is present.

6. Integrated circuit according to claim 1, wherein
   said first retraction unit (TRU1) indicates an allowance of a requested transaction retraction, if a valid command (CMD) issued from said first processing module (I) is present, and the valid command (CMD) has not been accepted yet by the second processing module (T).

7. Method for transaction retraction in an integrated circuit having a plurality of processing modules (I, T), comprising the steps of:
   issuing at least one transaction by at least one first processing module (I) towards at least one second processing module (T),
   indicating the allowance to retract said at least one transaction according to the state of said second processing module (T) to said at least one first of said processing modules (I).

8. Data processing system, comprising
   a plurality of processing modules (I, T), wherein at least one first processing module (I) issues at least one transaction towards at least one second processing module (T), comprising:
   at least one first transaction retraction unit (TRU1) for indicating an allowance to said at least one first of said processing modules (I) to retract said at least one transaction according to the state of said second processing module (T).

* * * * *